United States Patent [19]

Sugino et al.

[11] Patent Number: 4,505,638
[45] Date of Patent: Mar. 19, 1985

[54] UNDERWATER HYDRAULIC MOTOR

[75] Inventors: Kenji Sugino; Yukiaki Nagata, both of Uozu, Japan

[73] Assignee: Sugino Machine Limited, Uozu, Japan

[21] Appl. No.: 338,061

[22] Filed: Jan. 8, 1982

[30] Foreign Application Priority Data

Aug. 11, 1981 [JP] Japan ............................. 56-126287

[51] Int. Cl.³ ........................ F01D 11/00; F16J 15/50
[52] U.S. Cl. ................................ 415/113; 415/122 R; 415/502
[58] Field of Search ............... 415/106, 108, 109, 113, 415/122 R, 501, 502, 503, 175, 176, 111; 416/146 A; 308/187; 384/398

[56] References Cited

U.S. PATENT DOCUMENTS

| 2,386,898 | 10/1945 | Karassik | 415/113 X |
|---|---|---|---|
| 2,390,332 | 12/1945 | Schmidt | 415/175 |
| 2,702,215 | 2/1955 | Diefenderfer | 308/187 |
| 2,812,111 | 11/1957 | Wright et al. | 415/501 |
| 2,853,948 | 9/1958 | Aspelin | 415/175 X |
| 2,854,296 | 9/1958 | Eberle | 308/187 X |
| 3,258,199 | 6/1966 | Anderson | 415/175 |
| 3,264,653 | 8/1966 | Lebkuchner | 415/106 X |
| 3,664,758 | 5/1972 | Sato | 415/106 X |
| 3,850,550 | 11/1974 | Kaessen | 415/109 X |
| 3,954,348 | 5/1976 | Renaud | 415/113 |
| 4,019,591 | 4/1977 | Fox | 415/502 X |
| 4,086,020 | 4/1978 | Tanabe et al. | 415/106 |
| 4,242,039 | 12/1980 | Villard et al. | 415/112 |
| 4,329,127 | 5/1982 | Tschirky et al. | 308/187 X |
| 4,335,791 | 6/1982 | Evans | 308/187 X |

FOREIGN PATENT DOCUMENTS

| 1004929 | 3/1957 | Fed. Rep. of Germany | 415/122 |
|---|---|---|---|
| 1086127 | 1/1959 | Fed. Rep. of Germany | 415/122 |
| 500808 | 1/1920 | France | 415/106 |
| 698643 | 2/1931 | France | 415/106 |
| 1159988 | 7/1958 | France | 415/502 |
| 671060 | 4/1952 | United Kingdom | 415/106 |
| 781860 | 8/1957 | United Kingdom | 415/502 |
| 1206068 | 9/1970 | United Kingdom | 415/106 |
| 382548 | 8/1975 | U.S.S.R. | 416/146 A |

Primary Examiner—Philip R. Coe
Assistant Examiner—Frankie L. Stinson
Attorney, Agent, or Firm—Fleit, Jacobson, Cohn & Price

[57] ABSTRACT

A turbine-type underwater hydraulic motor includes a hermetically sealed chamber filled with oil, and bearings of rotating parts and a reduction gear unit are sealed in said sealed chamber. A part of the partitions isolating the sealed chamber from the exterior is comprised of a resilient member and thus the water pressure outside the motor and the oil pressures within the sealed chamber are balanced, thereby preventing the leakage of the oil and the entry of the water.

1 Claim, 3 Drawing Figures

UNDERWATER HYDRAULIC MOTOR

BACKGROUND OF THE INVENTION

The present invention relates generally to pressurized fluid actuated motors and more praticularly to hydraulic actuated motors of the type adapted for use under water. More particularly, the present invention relates to a underwater hydraulic motor which is adapted for use under deep water.

Among various motors known in the art which are actuated by pressurized fluid, air motors which are actuated by compressed air and oil hydraulic motors which are actuated by hydraulic oil are in wide use. In accordance with a structual classification, the known motors include vane motors, plunger motors, turbine motors, etc., and these motors have been used effectively. However, these prior art motors give rise to many problems from the standpoints of performance, etc., when they are put in underwater applications. For instance, while the air motor has the advantage of being capable of discharging the exhaust into the water, where the normal service air pressure is used, the air motor can be used only under water of a limited depth. On the other hand, the oil hydraulic motor requires two supply and discharge pipes with the resulting complicated construction and moreover there is the danger of the hydraulic oil leaking and contaminating the surrounding water area.

While the use of an electric motor under water may be conceived, there is the disadvantage of requiring a complicated and large-sized mechanism for completely shutting off the entry of water into the motor and moreover there is the disadvantage of causing an electric shock by a leakage of electricity.

SUMMARY OF THE INVENTION

The present invention has been made to overcome the foregoing deficiencies in the prior art and it is the primary object of the invention to provide a underwater hydraulic motor which eliminates the use of any drain pipe through the use of pressurized water as a working fluid and which can be used effectively even under deep water.

Thus, in accordance with one form of this invention there is provided a underwater hydraulic motor comprising a turbine rotor adapted to be rotated in response to a jet of pressurized water, an output shaft for transmitting the rotatry power of the turbine rotor to an external mechanical load, a reduction gear unit interposed between the turbine rotor and the output shaft, an oil immersion chamber containing therein the bearings of the turbine rotor and the output shaft and the reduction gear unit, filled with oil and sealed hermetically, and a resilient member forming a part of partition means between the interior of the oil immersion chamber and the motor exterior, whereby when the motor is used under deep water, the resilient member is expanded or contracted so as to balance the oil pressures within the oil immersion chamber against the water pressure outside the motor and thereby to prevent leakage of the oil or the entry of water into the motor.

The resilient member is in the form of an annular hollow member which is contained within an annular cavity enclosed by motor body means so as to be arranged in concentric relation with the turbine rotor, and the interior of the annular cavity is communicated with the exterior of the motor via holes formed through the motor body means. Thus, there is an advantage that the resilient member forming the annular hollow member is compactly incorporated in the motor assembly and moreover the resilient member is protected from external forces and not to be damaged easily.

In accordance with another form of the invention, the underwater hydraulic motor further comprises a seal ring disposed at the back of the turbine rotor to be placed thereon concentrically, and hole means provided to balance the water pressures on both sides of the seal ring, the hole means including holes formed through the turbine rotor and holes formed through the motor body to communicate the back of the seal ring with the exterior of the motor, whereby the water pressures on both sides of the seal ring are balanced so as to effectively prevent wear of the seal ring and prevent any reduction in the life of the seal ring.

The underwater hydraulic motor of this invention has the general advantage of the turbine type which eliminates the use of any sliding sealing means and ensures a longer life as compared with the vane-type and plunger-type motors.

The above and other objects of this invention and details of its construction and features will become more apparent from the following description of a preferred embodiment taken in conjunction with the accompanying drawings.

DESCRIPTION OF THE PREFERRED EMBODIMENTS

Figure 1:
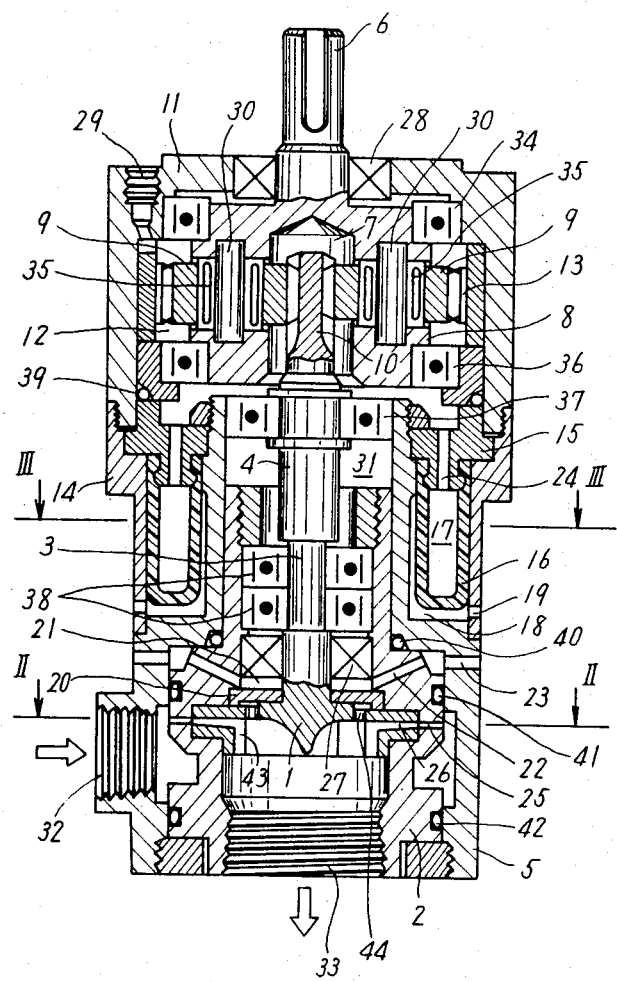
FIG. 1 is a longitudinal side sectional view of an embodiment of the invention.
Figure 2:
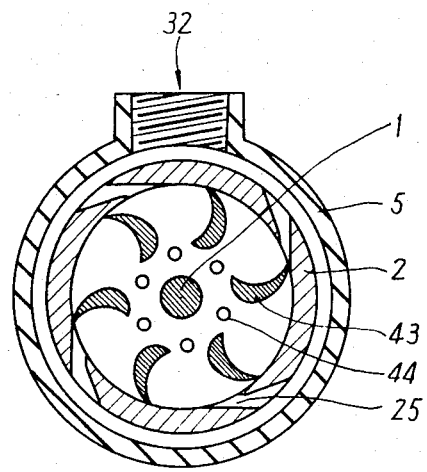
FIG. 2 is a sectional view taken along the line II—II of FIG. 1.
Figure 3:
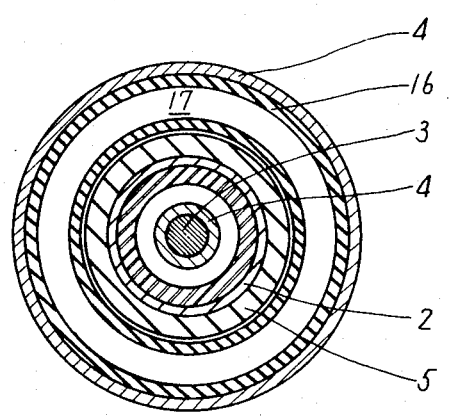
FIG. 3 is a sectional view taken along the line III—III of FIG. 1.

Referring to FIGS. 1 to 3, a turbine rotor 1 is made integral with a rotary shaft 3 which is rotatably supported in a casing 2 by means of bearings 38, and fixedly mounted to the casing 2 between the rotor 1 and the bearings 38 is a sealing member 27 which divides the interior of the casing 2 into a rotor-side back chamber 21 and a bearing-side intermediate chamber 31. A gear shaft 4 is concentrically and fixedly coupled to the rotary shaft 3 and is rotatably supported in a body 5 by means of a bearing 37. An output shaft 6 is formed at its one end with a coaxially opened boring 7 which receives the other end of the gear shaft 4. A plurality of planetary gears 9 are supported on shafts 30 in a projection 8 on the end side of the output shaft 6, and the gears 9 are engaged with a gear 10 formed on the other end of the gear shaft 4. Numeral 11 designates a gear box forming a reduction gear unit which rotatably supports the output shaft 6 by means of bearings 34 and 36 and is formed therein with a reduction gear chamber 12 in which an internal thread gear 13 is fixedly fitted and engaged with the gears 9. An annular member 15 is fitted at the open end of the reduction gear chamber 12 between the gear box 11 and an intermediate body 14, and a resilient member 16 forming an annular hollow member is disposed within an annular cavity 18 defined at a position between the rotor 1 and the reduction gear chamber 12 concentrically with the rotary shaft 3 by the small-diameter portion of the turbine body 5 and the intermediate body 14. The resilient member 16 is also fitted on the annular member 15 so that an oil reservoir chamber 17 is formed inside the resilient member 16 and communicated with the reduction gear chamber 12 and the intermediate chamber 31. The annular cavity 18 which is defined by the turbine body 5 and the intermediate body 14 and receiving the resilient member 16 or the chamber for accommodating the resilient member 16 is communicated with the exterior of the motor by way of holes 19 formed through the intermediate body 14, and the oil reservoir chamber 17 is communicated with the reduction gear chamber 12 by way of holes 24 formed through the annular member 15. A seal ring 20 is fitted at the bearing 38 side back of the rotor 1 so as to be placed concentrically thereon, and the back chamber 21 formed at the back of the seal ring 20 is communicated with the exterior of the motor by way of holes 22 formed through the casing 2 and holes 23 formed through the turbine body 5. Numeral 25 designates nozzles formed through the casing 2 and opened to supply a jet of pressurized water against a water receiving portion 26 of the rotor 1. Numeral 28 designates a sealing member tightly fitted in the gear box 11 for sliding contact with the output shaft 6. Numeral 29 designates an oil filling plug.

With the motor constructed as described above, the reduction gear chamber 12, the oil reservoir chamber 17 and the intermediate chamber 31 form an oil immersion chamber which is filled with a lubricating oil. In other words, the oil is supplied through the oil filling plug 29 during the assemblage or at the time of use so that during operation the gears 9, the gear 10, the internal thread gear 13 and the bearings 34, 35, 36, 37 and 38 are lubricated. The lubricating oil is confined by the sealing members 27, 28, 39 and 40 and the resilient member 16 and prevented from leaking to the outside of the motor. In operation, pressurized water is supplied by way of a supply port 32. Since sealing members 41 and 42 are provided for the pressurized water, there is no possibility of the pressurized water leaking to any other places and the water can be effectively shot out through the nozzles 25 formed through the casing 2 toward inner turbine blades 43. The water is accelerated by the nozzles 25 so that the resulting high-velocity water stream strikes against the blades 43 of the rotor 1 and this impact force rotates the rotor 1. After rotating the rotor 1, the water is discharged to the exterior of the motor via a drain port 33. Considering the fact that the use environment of this hydraulic motor is under water, it is a matter of course that the pressurized water supplied via the water supply port 32 must have a higher pressure than the water pressure of the water in which the hydraulic motor is placed. Since the water discharged from the drain port 33 is more or less high in pressure as compared with the water outside the motor so that the rotor 1 is subjected to a rearward thrust load, in order to prevent it the rotor 1 is formed with holes 44 which communicate with the portions on its front and back sides thus reducing the thrust load and thereby ensuring smooth rotation of the rotor 1. On the other hand, while the seal ring 20 performs a sealing action between it and the rotary shaft 3, during the operation of the rotor 1, when the pressurized water entering via the supply port 32 is spouted from the nozzles 25, the pressurized water goes around to the back of the rotor 1 through the small opening between the rotor 1 and the casing 2 and further the pressurized water applies a pressure to the back chamber 21 of seal ring 20 through the small opening between the seal ring 20 and the rotary shaft 3. As a result, the seal ring 20 is pressed against the back of the rotor 1 thus decreasing its life due to premature wear, heat generation, etc. Therefore, the back chamber 21 of the seal ring 20 is communicated with the exterior of the motor through the holes 22 formed through the casing 2 and the holes 23 formed through the turbine body 5 so that the holes 22 and 23 cooperate with the holes 44 formed through the rotor 1 and balance the pressures on both sides of the seal ring 20, thus reducing wear of the seal ring 20. The rotation of the rotor 1 is transmitted from the rotary shaft 3 to the gear shaft 4. While the gears 9 mounted in the projection 8 of the output shaft 6 are engaged with the gear 10 of the gear shaft 4 so as to be rotated by the rotation of the gear 10, the gears 9 are engaged with the internal thread gear 13 in addition to the gear 10 so that when the gear 10 is rotated, the gears 9 rotate on their axes around the shafts 30 while orbiting around the gear 10. In other words, the gears 9 make a planetary motion. Thus, when the gears 9 orbit around the gear 10, the output shaft 6 is also rotated by way of the shafts 30.

Where the hydraulic motor of this invention is used under water, particularly under deep water, the water outside the motor is introduced into the annular cavity 18 through the holes 19 formed at the predetermined positions of the intermediate body 14 and the water pressure corresponding to the depth acts on the resilient member 16, thus causing the pressure in the oil reservoir chamber 17 to become equal to the pressure in the annular cavity 18 or the pressure outside the motor. Since the oil reservoir chamber 17 is communicated with the reduction gear chamber 12 and the intermediate chamber 31 via the holes 24 formed through the annular member 15, the pressures within the oil reservoir chamber 17, the reduction gear chamber 12 and the intermediate chamber 31 become equal to one another and this has the effect of providing substantially the same pressure on each of the oil and water sides of the sealing members 27, 28, 39 and 40 which are isolating the interior of the oil immersion chamber comprising the reduction gear chamber 12, the oil reservoir chamber 17 and the intermediate chamber 31 from the exterior of the motor. As a result, there is no danger of the lubricating effect being deteriorated due to mixing of the water with the oil or contaminating the surrounding water area due to the leakage of the oil into the water and the motor is allowed to operate very effectively. Since the boundary between the oil reservoir chamber 17 and the annular cavity 18 is provided by the resilient member 16, quick response to variations in the water pressure is ensured and moreover the resilient member 16 can be expanded and contracted to effectively deal with a large volumetric variation caused when the lubricating oil contains bubbles.

It will thus be seen that by balancing the pressures in the rotor section against the external pressure and also balancing the pressures in the lubricating oil chamber against the external pressure, the stress exerted on each of the component parts can be decreased and also mixing of the water with the oil or leakage of the oil into the water can be prevented, thus ensuring stable operation of the motor under deep water over a long period of time.

While the hydraulic motor of this invention can be used extremely advantageously particularly under deep water, the hydraulic motor of this invention is not intended to be limited to applications under water and it can also be used effectively as a hydraulic rotatory power source in the atmosphere.

What is claimed is:

1. In an underwater hydraulic motor including a casing, a turbine rotor within said casing and rotatable in response to a jet of pressurized water applied thereto, an output shaft for transmitting rotary power of said turbine rotor to an external mechanical load, and reduction gear means disposed between said turbine rotor and said output shaft, the improvement comprising:

an oil immersion chamber containing therein bearings of said turbine rotor, said reduction gear means and bearings of said output shaft, said oil immersion chamber being filled with oil and sealed hermetically;

resilient means forming a part of partition means between the interior of said oil immersion chamber and the exterior of said motor, said resilient means being in the form of an annular hollow member arranged in concentric relation with said turbine rotor, wherein said annular hollow member is accommodated in an annular cavity enclosed by motor body means, and wherein the interior of said annular cavity is in communication with the exterior of said motor through a plurality of holes extending through said motor body means;

a seal ring superposed on the back of said turbine rotor in concentric relation, and hole means provided in said rotor for balancing pressures on both sides of said seal ring; and a back chamber provided at the back of said seal ring on the opposite side thereof from said turbine rotor, said back chamber communicating with the exterior of said motor by hole means extending from said back chamber through said casing.

* * * * *